United States Patent
Yoshida

(10) Patent No.: US 6,381,476 B1
(45) Date of Patent: Apr. 30, 2002

(54) PORTABLE RADIO TERMINAL

(75) Inventor: Kenichi Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/458,038

(22) Filed: Dec. 10, 1999

(30) Foreign Application Priority Data

Dec. 10, 1998 (JP) .......................................... 10-351933

(51) Int. Cl.[7] .............................. H04B 1/38; H04M 1/00
(52) U.S. Cl. ....................... 455/566; 455/550; 455/310; 455/63; 340/7.51; 340/7.55; 348/14.02; 348/14.03
(58) Field of Search .................................. 455/566, 550, 455/575, 574, 63, 154.2, 158.4, 158.5, 310; 340/7.51, 7.55, 7.56, 7.32, 7.38, 7.52; 348/14.02, 14.03, 14.14; 345/1.2, 2.3, 5

(56) References Cited

U.S. PATENT DOCUMENTS

| | | | | |
|---|---|---|---|---|
| 5,471,663 A | * | 11/1995 | Davis | 455/296 |
| 5,495,517 A | * | 2/1996 | Ide et al. | 455/458 |
| 5,765,113 A | * | 6/1998 | Russo et al. | 455/557 |
| 5,909,639 A | * | 6/1999 | Takahashi | 340/7.55 |
| 6,023,231 A | * | 2/2000 | Tsunoda | 340/7.55 |
| 6,192,257 B1 | * | 2/2001 | Ray | 455/566 |
| 6,115,619 A1 | * | 9/2001 | Cho | 455/566 |
| 6,292,676 B1 | * | 9/2001 | Ozaki et al. | 455/566 |

FOREIGN PATENT DOCUMENTS

| | | |
|---|---|---|
| JP | 2-141034 | 5/1990 |
| JP | 4-281622 | 10/1992 |

* cited by examiner

Primary Examiner—Nay Maung
Assistant Examiner—Temica M. Davis
(74) Attorney, Agent, or Firm—Foley & Lardner

(57) ABSTRACT

In a portable radio terminal having a liquid crystal display, when a radio data receiving period overlaps the timing of outputting a liquid crystal alternating signal to the liquid crystal display, the outputting of the liquid crystal alternating signal is deferred until the radio data receiving period ends, whereby the angle of the liquid crystal is not inverted until the radio data receiving period ends. Therefore, during the radio data receiving period, there does not occur a noise caused because of the inversion of the angle of the liquid crystal, with the result that the receiving sensitivity is not deteriorated.

20 Claims, 5 Drawing Sheets

PORTABLE RADIO TERMINAL

BACKGROUND OF THE INVENTION

The present invention relates to a portable radio terminal such as a pager and a mobile telephone.

In the prior art in order to minimize influence of noises generated from a liquid crystal display (LCD) used as a display means in a portable radio terminal, a shield is provided. However, with a recent advanced miniaturization of the portable radio terminal, the liquid crystal display and a radio unit have become located close to each other. Because of this, when the radio unit is in a condition of receiving a radio data, a processing for inverting an angle of orientation axis in a liquid crystal becomes a cause of a noise generation, with the result that a receiving sensitivity of the radio unit is deteriorated.

In order to overcome this problem, Japanese Patent Application Pre-examination Publication No. JP-A-04-281662 proposes to change a frame frequency of the liquid crystal display so as to reduce the noise to a transmission signal of a radio communication instrument. Alternatively, Japanese Patent Application Pre-examination Publication No. JP-A-02-141034 proposes a technology featured to stop the display in the liquid crystal display during a receiving period.

In JP-A-04-281662 however. even if the frame frequency is lowered, since the processing for inverting the angle of orientation axis in the liquid crystal is still required to be executed at a constant period, the influence to the radio unit is inevitable, and therefore, it is not possible to satisfactorily prevent the deterioration of the receiving sensitivity. In particular, in a receiving condition, since a signal having a very small level is received, a sufficient sensitivity is necessary, and therefore, it is greatly influenced by a noise attributable to the processing for inverting the angle of orientation axis in the liquid crystal.

In JP-A-02-141034, on the other hand, since the display is not carried out in the liquid crystal display during the receiving period, if the receiving period becomes so long to exceed the length of time which cannot be perceived by eyes of a human being, the display flickers to a seeing person, and therefore, becomes hard to see.

BRIEF SUMMARY OF THE INVENTION

Accordingly, it is an object of the present invention to provide a portable radio terminal which has overcome the above mentioned problem of the prior art.

Another object of the present invention is to provide a portable radio terminal capable of avoiding the deterioration of the receiving sensitivity by preventing generation of the noise during a radio data receiving period, without flickering of the display in tie liquid crystal display.

The above and other objects of the present invention are achieved in accordance with the present invention by a portable radio terminal comprising:

a radio transmitting and receiving means for transmitting and receiving a radio data;

a memory means for storing a display data, a control means receiving data received by the radio transmitting and receiving means, to generate a display data and to write the display data into the memory means;

a liquid crystal display means for visually displaying the display data; and a display control means reading out the display data from the memory means for controlling the liquid crystal display means to cause the liquid crystal display means to visually display the display data, the display control means outputting a liquid crystal alternating signal to the liquid crystal display means at each time an image displayed in the liquid crystal display means is changed from one frame to a next frame, thereby to invert an angle of a liquid crystal in the liquid crystal display means, wherein when a radio data receiving period overlaps the timing of outputting the liquid crystal alternating signal, the display control means defers the outputting of the liquid crystal alternating signal until the radio data receiving period ends, whereby the angle of the liquid crystal in the liquid crystal display means is not inverted until the radio data receiving period ends.

With this arrangement, when the radio data receiving period overlaps the time of outputting the liquid crystal alternating signal, since the timing for outputting the liquid crystal alternating signal is deferred until the radio data receiving period ends, it is possible to prevent generation of the noise caused because of the inversion of the angle of orientation axis in the liquid crystal, with the result that the receiving sensitivity is not deteriorated.

In an embodiment of the portable radio terminal, when the display control means defers the outputting of the liquid crystal alternating signal the display control means defers an outputting of a horizontal scan signal and a frame signal to be supplied to the liquid crystal display means.

In this embodiment, since not only the liquid crystal alternating signal but also the horizontal scan signal and the frame signal are deferred, it is possible to prevent a flickering of a displayed image which would have otherwise occurred by deferring the liquid crystal alternating signal.

In a preferred embodiment, radio transmitting and receiving means transmits and receives data in a time division system, and the display control means defers the outputting of the liquid crystal alternating signal by a length of time on the order of several milliseconds which corresponds to one receiving time slot.

In this embodiment, since the liquid crystal alternating signal is deferred by only the radio data receiving period (which is on the order of several milliseconds), the image sticking never occurs in the liquid crystal.

More preferably, the display control means defers the outputting of the horizontal scan signal and the frame signal by a length of time on the order of several milliseconds which corresponds to one receiving time slot.

In this case, since the horizontal scan signal and the frame signal are deferred by only the radio data receiving period (which is on the order of several milliseconds) the number of frames displayed in the liquid crystal display is never reduced to the degree which can be perceived by a human being, and therefore, the displayed image does not become hard to see.

Specifically, the control means ceaselessly updates the data stored in the memory means to a latest information, and the display control means reads the data from the memory means at the time of transferring the display data to the liquid crystal display means.

In this case, when the radio data receiving period overlaps the timing of changing from one frame to a next frame, the display of the next frame is deferred. However, since the data stored in the memory means is ceaselessly updated to the latest information by the control means and on the other hand the display control means reads the data from the memory means at the time of transferring the display data to the liquid crystal display, the data updated to the latest information is ceaselessly transferred to the liquid crystal display, with the result that the image displayed in the liquid crystal display is not deferred to the degree which can be perceived by a human being, and therefore, the displayed image does not become hard to see.

In the above mentioned portable radio terminal, the control means is configured to perform the function of the display control means. In this situation, the display control means can be omitted.

The above and other objects, features and advantages of the present invention will be apparent from the following description of preferred embodiments of the invention with reference to the accompanying drawings.

DETAILED DESCRIPTION OF THE INVENTION

Embodiments of the portable radio terminal in accordance with the present invention will be described with reference to the accompanying drawings.

First Embodiment

Figure 1:
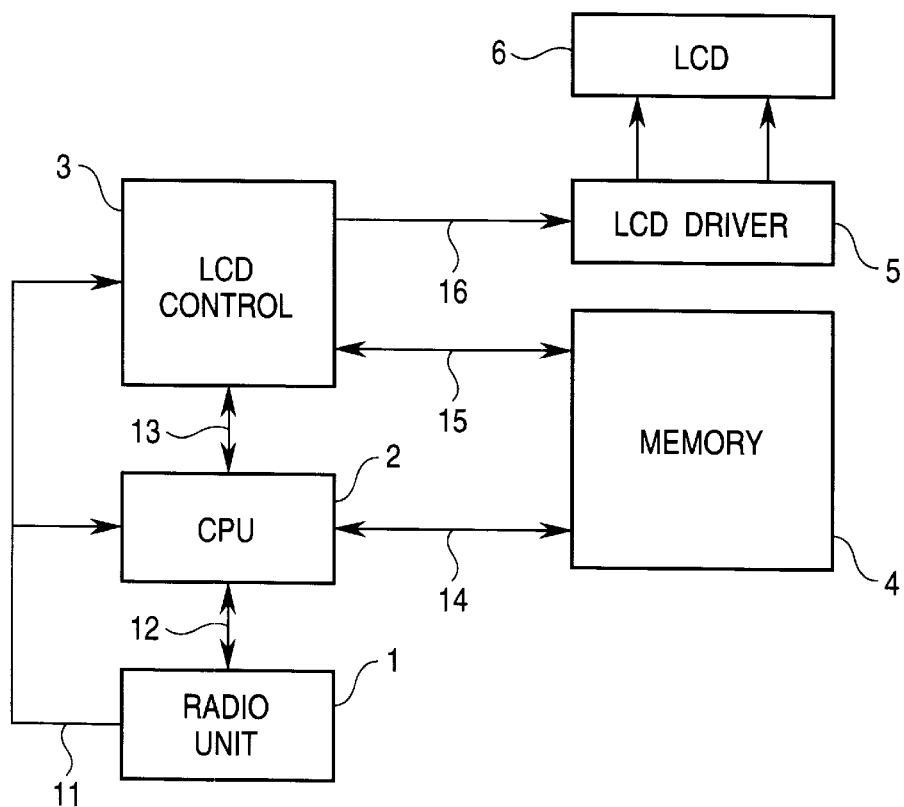
FIG. 1 is a block diagram of an essential part of a first embodiment of the portable radio terminal in accordance with the present invention.

Referring to FIG. 1, there is shown a block diagram of an essential part of a first embodiment of the portable radio terminal in accordance with the present invention.

The shown portable radio terminal includes a radio unit 1 for transmitting and receiving data in a time division, a CPU (central processing unit) 2 for controlling various parts in the terminal and for processing data, a liquid crystal display (LCD) 6 for displaying data to be transmitted and a received data, an LCD controller 3 for generating controlling timings for the liquid crystal display 6, a memory 4 for storing data, and an LCD driver 5 for driving the liquid crystal display 6, which arm coupled as shown.

The radio unit 1 supplies a receiving synchronism signal 11 to the CPU 2 and the LCD controller 3 during a radio data receiving period. As designated by the reference numbers 12, 13, and 14 in FIG. 1, the CPU 2 controls the radio unit 1, the LCD controller 3 and the memory 4, and also sends and receives data to and from the radio unit 1, the LCD controller 3 and the memory 4. For example, the CPU 2 receives data from the radio unit 1, and supplies data to be transmitted, to the radio unit 1. When the CPU 2 receives data received by the radio unit 1, the CPU 2 generates a display data for causing the liquid crystal display 6 to visually display the data received by the radio unit 1, and writes and stores the display data into the memory 4. In this connection, the display data stored in the memory 4 is ceaselessly updated to the latest information by the CPU 2. The LCD controller 3 reads out the display data from the memory 4, as designated by the reference number 15 in FIG. 1, and outputs timing signals and data to the LCD driver 5 at respective predetermined intervals, as designated by the reference number 16 in FIG. 1, in order to cause the liquid crystal display 6 to display the display data.

The LCD driver 5 drives the liquid crystal display 6 to cause the liquid crystal display 6 to display the display data supplied from the LCD controller 3. In this case, when one line of display data has been displayed in the liquid crystal display 6, a horizontal scan signal is outputted from the LCD controller to the LCD driver in order to change the display line to a next line. In addition, when one frame of display data has bee displayed, a frame signal is outputted from the LCD controller to the LCD driver in order to change the display to a next frame. Furthermore, an LCD alternating signal, which a timing signal for inverting the angle of orientation axis in the liquid crystal in order to prevent an image sticking in the liquid crystal, is supplied from the LCD controller to the LCD driver 5. Under an ordinary practice, the angle of orientation axis in the liquid crystal is inverted in synchronism with the frame signal, in order to prevent a flickering of an displayed image.

According to the present invention, when the timing for outputting the LCD alternating signal overlaps the radio data receiving period, the LCD controller 3 does not output the LCD alternating signal until the radio data receiving period terminates. After the radio data receiving period has terminated, the LCD controller 3 outputs the LCD alternating signal, and the display operation is succeedingly carried out in the conventional practice.

In the above mentioned arrangement, the radio unit 1 constitutes a radio transmitting and receiving means and the CPU 2 constitutes a control means. The LCD controller 3 constitutes a display control means, and the LCD driver 5 and the liquid crystal display 6 constitute a liquid crystal display means.

Figure 2:
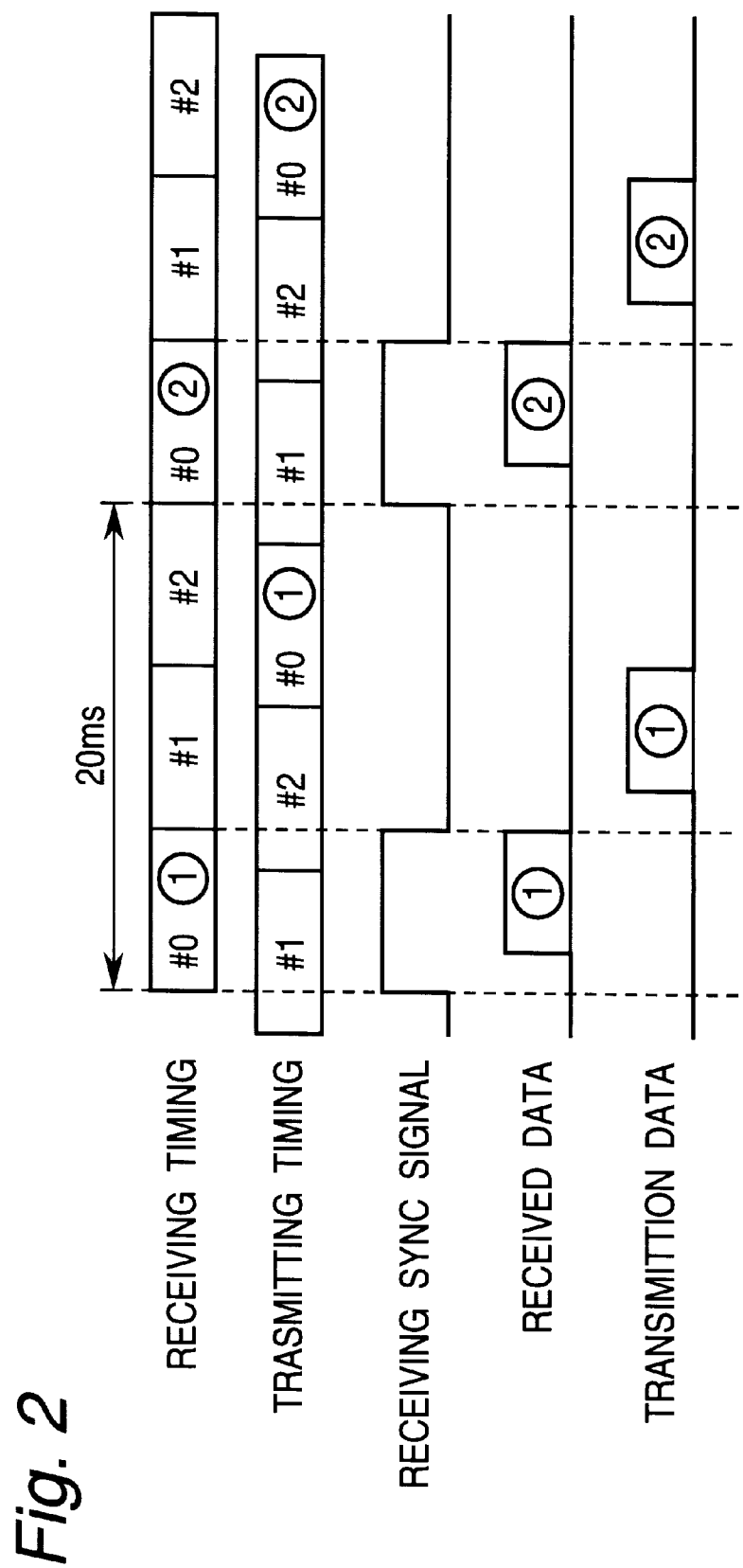
FIG. 2 is a timing chart for illustrating an operation of the first embodiment of the portable radio terminal in a receiving condition.

Now, a receiving operation of the shown embodiment of the portable radio terminal will be described with reference to the timing chart of FIG. 2. The shown timing chart is a typical example of transmission and reception timings in a 3-channel multiplexed TDMA (time division multiple access) system. Particularly, the shown example illustrates a case that, first, a reception is carried out, and thereafter, a transmission is carried out. Each of the reception and the transmission is carried out over a period of time of 6.67 ms (20/3 ms), one time per a period of 20 ms. In this case, the reception is carried out in a slot #0. The data of the encircled "1" is received in a first slot of the slot #0, and the data of the encircled "2" is received in a second slot of the slot #0. In addition, a receiving synchronism signal is outputted in synchronism with the receiving timing (receiving period), at an interval of 20 ms.

Next, a manner for outputting a display data for the liquid crystal display 6 will be described with reference to FIG. 3 which illustrates a dot and line structure in one frame of the liquid crystal display 6, and FIG. 4 which is a timing chart for illustrating a liquid crystal display control.

Figure 3:
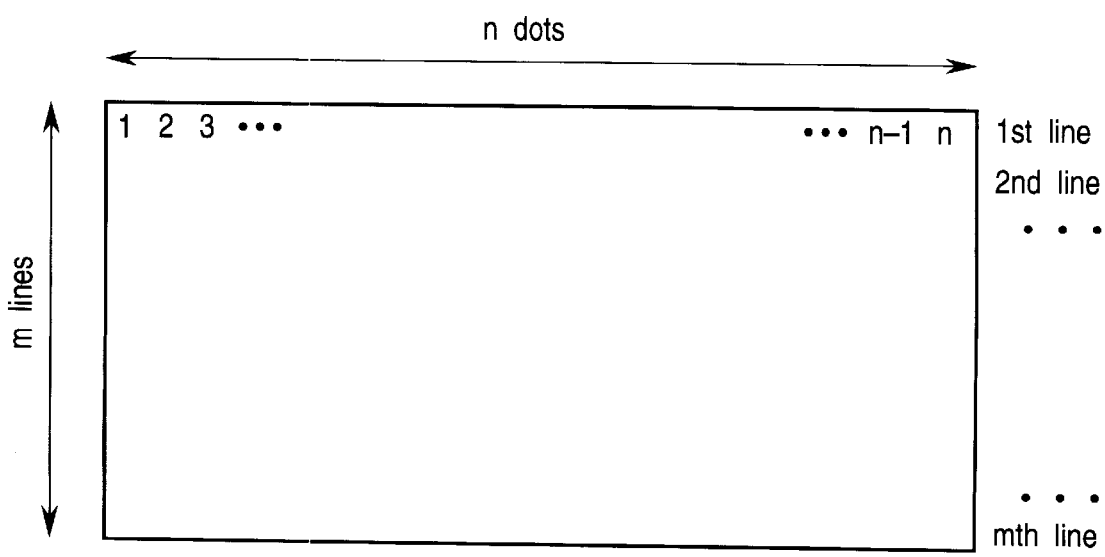
FIG. 3 illustrates a dot and line structure in one frame of the liquid crystal display.
Figure 4:
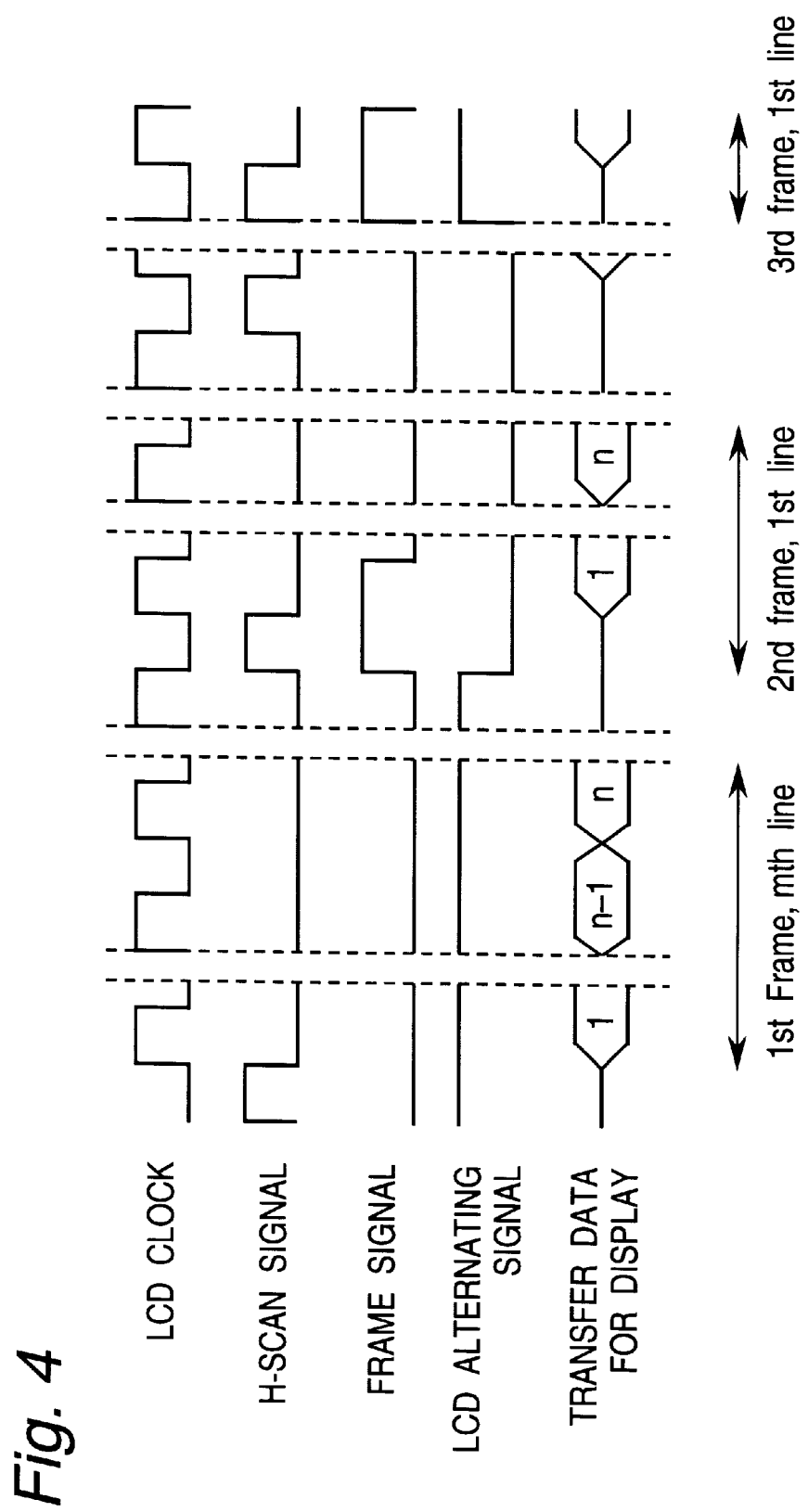
FIG. 4 is a timing chart for illustrating a liquid crystal display control in the first embodiment of the portable radio terminal.

As shown in FIG. 3, the liquid crystal display 6 includes "n" dots in a horizontal direction, and "m" lines in a vertical direction. Since the display data for one dot is transferred with one data transfer (at each LCD clock) from the LCD controller to the LCD driver, the LCD controller 3 executes "n" data transfers for displaying one line of display data. In addition, in order to change the display line to a next line, the LCD controller 3 outputs a horizontal scan signal to the LCD driver (shown in FIG. 4). Furthermore, When the data transfer for the "m" lines is completed and the display should be changed to a next frame, the horizontal scan signal is outputted at the completion of the display of the "m"th line, and simultaneously, a frame signal (shown in FIG. 4) is outputted for changing to the next frame. At the time of changing to the next frame, a LCD alternating signal (shown in FIG. 4) is outputted to invert the angle of orientation axis in the liquid crystal, thereby to prevent the image sticking in the liquid crystal display. With this arrangement, when the frame is updated, since the image displayed in the liquid crystal display 6 is never changed there occurs no flickering in the displayed imaged even if the angle of orientation axis in the liquid crystal is inverted. By repeating the above mentioned processing, data continues to be displayed in the liquid crystal display 6.

Figure 5:
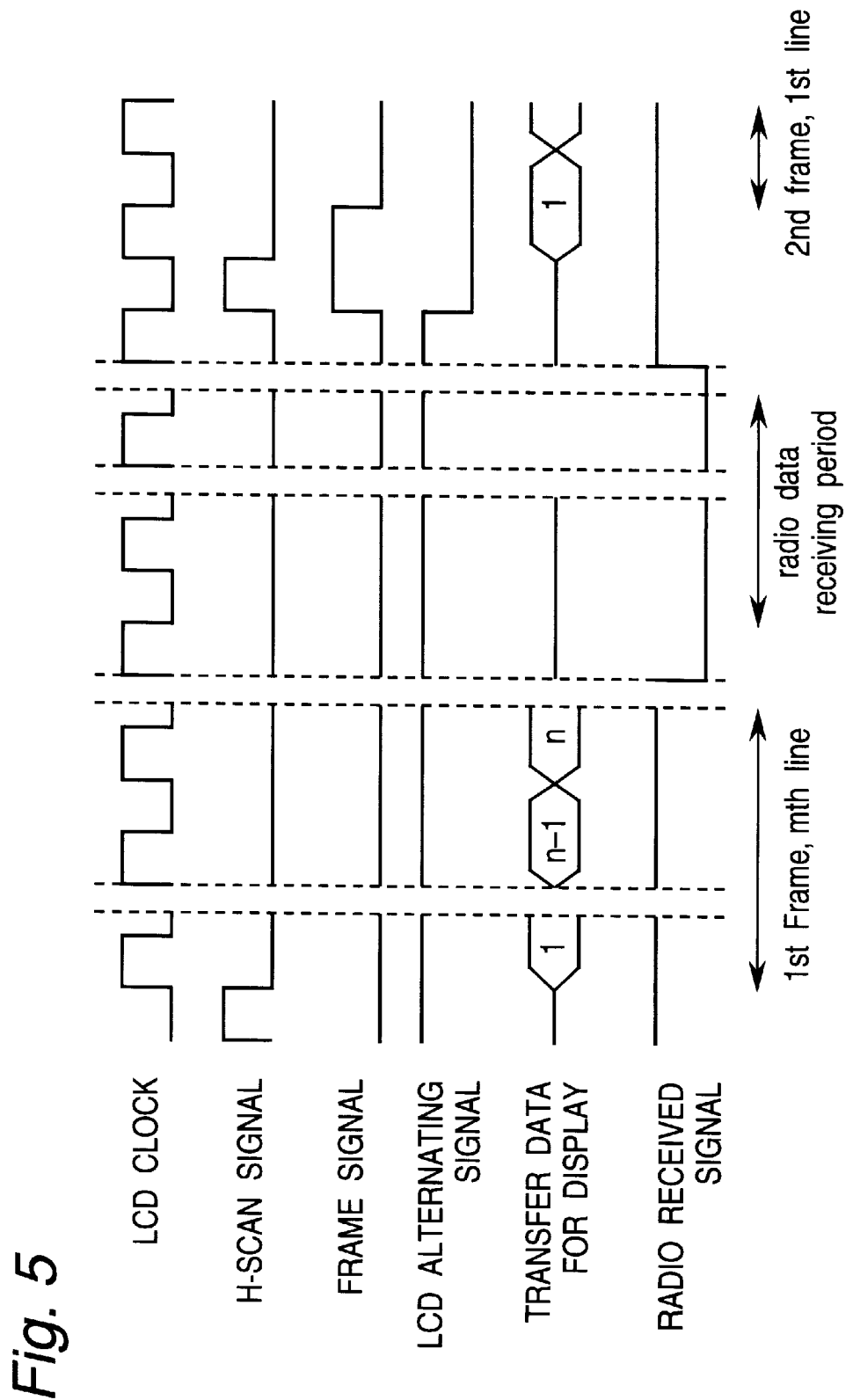
FIG. 5 is a timing chart for illustrating the liquid crystal display control in the first embodiment of the portable radio terminal in a radio data receiving condition.

Next, the liquid crystal display control timing in the radio data receiving condition will be described with reference to FIG. 5. The timing chart shown in FIG. 5 illustrates a situation that the radio data receiving period starts around the time the display of a first frame is completed. Even if the radio data receiving period overlaps the time of continuing to transfer data in the same frame, the transfer of data to the liquid crystal display 6 is continued. However, if the radio data receiving period starts after the ending of one frame but before a beginning of a next frame, the changing to the next frame is suspended until the radio data receiving period ends. Namely, none of the horizontal scan signal, the frame signal and the LCD alternating signal is supplied until the radio data receiving period ends, as shown in FIG. 5. After the radio data receiving period ends, the horizontal scan signal, the frame signal and the LCD alternating signal are supplied at respective timings, so that the ordinary display processing for the liquid crystal display 6 is continued.

As mentioned above, if the radio data receiving period overlaps the time of outputting the LCD alternating signal, the timing for outputting the LCD alternating signal is deferred until the radio data receiving period ends. Therefore, the noise caused because of the inversion of the angle of orientation axis in the liquid crystal, is not generated during the radio data receiving period, with the result that the receiving sensitivity is not deteriorated. In addition, not only since the LCD alternating signal is deferred, but also since the horizontal scan signal and the frame signal are deferred, it is possible to prevent a flickering of a displayed image which would have otherwise occurred by deferring the LCD alternating signal.

Furthermore, since the length of delay time is as short as the radio data receiving period (which is 6.67 ms (20/3 ms) since one time per a period of 20 ms), the image sticking does not occur in the liquid crystal. In addition, since the number of frames displayed in the liquid crystal display is never reduced to the degree which can be perceived by a human being, the displayed image does not become hard to see. Moreover, since the data stored in the memory 4 is ceaselessly updated to the latest information by the CPU 2 and on the other hand the LCD controller 3 reads the data from the memory 4 at the time of transferring the display data to the LCD driver 5 and hence the liquid crystal display 6, the display data updated to the latest information is ceaselessly transferred to the LCD driver 5 and hence the liquid crystal display 6, with the result that the image displayed in the liquid crystal display 6 is not deferred to the degree which can be perceived by a human being, and therefore, the displayed image does not become hard to see.

Second Embodiment

Now, a second embodiment of the portable radio terminal in accordance with the present invention will be described with reference to FIG. 6.

Figure 6:
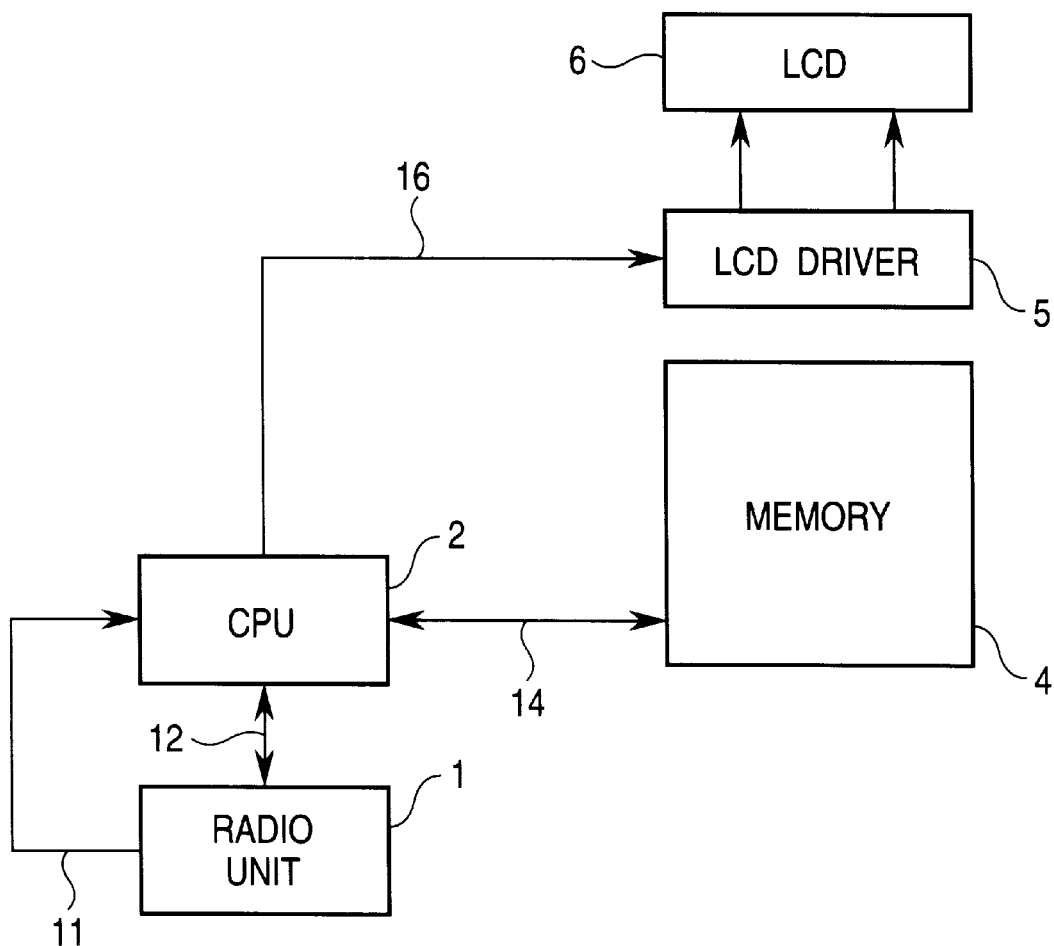
FIG. 6 is a block diagram of an essential part of a second embodiment of the portable radio terminal in accordance with the present invention.

The second embodiment shown in FIG. 6 is different from the first embodiment shown in FIG. 1 only in that the LCD controller 3 is omitted and the CPU 2 directly controls the LCD driver 5. Therefore, in FIG. 6, elements corresponding to the those shown in FIG. 1 are given the same reference numbers, and explanation will be limited to those which are different in function from the first embodiment shown in FIG. 1.

In this second embodiment, the CPU 2 controls the LCD driver 5 and hence the liquid crystal display 6, through an output port of the CPU 2 in accordance with an internal program of the CPU 2. However, the operation timings are the same as those in the first embodiment. The CPU 2 stores in the memory 4 the received data supplied from the radio unit 1, and the CPU 2 executes the processing which is executed by the LCD controller 3 in the first embodiment. Namely, the CPU 2 read out the display data from the memory 4, and transfers the read-out display data to the LCD driver 5. In addition, the horizontal scan signal, the frame signal and the LCD alternating signal, which are the control timing signals for the liquid crystal display 6, are outputted from the CPU 5 at the same timings as those shown in FIGS. 4 and 5. Thus, since a circuit corresponding to the LCD controller 3 becomes unnecessary in the second embodiment, the circuit size can be reduced in comparison with the first embodiment.

As seen from the above, the portable radio terminal in accordance with the present invention exerts the following various advantages;

A first advantage is that when the radio data receiving period overlaps the time of outputting the LCD alternating signal, since the timing for outputting the LCD alternating signal is deferred until the radio data receiving period ends, it is possible to prevent generation of the noise caused because of the inversion of the angle of orientation axis in the liquid crystal, with the result that the receiving sensitivity is not deteriorated.

A second advantage is that since not only the LCD alternating signal but also the horizontal scan signal and the frame signal are deferred, it is possible to prevent a flickering of a displayed image which would have otherwise occurred by deferring the LCD alternating signal.

A third advantage is that since the LCD alternating signal is deferred by only a very short time as the radio data receiving period (which is on the order of several milliseconds in the case of the time division system), the image sticking never occurs in the liquid crystal.

A fourth advantage is that since the horizontal scan signal and the frame signal are deferred by only a very short time as the radio data receiving period (which is on the order of several milliseconds in the case of the time division system), the number of frames displayed in the liquid crystal display is never reduced to the degree which can be perceived by a human being, and therefore, the displayed image does not become hard to see.

A fifth advantage is that; When the radio data receiving period overlaps the timing of changing from one frame to a next frame, the display of the next frame is deferred. However, since the data stored in display memory means is ceaselessly updated to the latest information by the control means and on the other hand the display control means reads the data from the memory means at the time of transferring the display data to the liquid crystal display, the data updated to the latest information is ceaselessly transferred to the liquid crystal display, with the result that the image displayed in the liquid crystal display is not deferred to the degree which can be perceived by a human being, and therefore, the displayed image does not become hard to see.

The invention has, thus been shown and described with reference to the specific embodiments. However, it should be noted that the present invention is in no way limited to the details of the illustrated structures but changes and modifications may be made within the scope of the appended claims.

What is claimed is:

1. A portable radio terminal comprising:
   a radio transmitting and receiving means for transmitting and receiving a radio data;
   a memory means for storing a display data;
   a control means receiving data received by said radio transmitting and receiving means, to generate a display data and to write said display data into said memory means;
   a liquid crystal display means for visually displaying said display data; and
   a display control means reading out said display data from said memory means for controlling said liquid crystal display means to cause said liquid crystal display means to visually display said display data, said display control means outputting a liquid crystal alternating signal to said liquid crystal display means at each time an image displayed in said liquid crystal display means is changed from one frame to a next frame, thereby to invert an angle of a liquid crystal in said liquid crystal display means,
   wherein when a radio data receiving period overlaps the timing of outputting said liquid crystal alternating signal, said display control means defers the outputting of said liquid crystal alternating signal until said radio data receiving period ends, whereby the angle of the liquid crystal in said liquid crystal display means is not inverted until said radio data receiving period ends.

2. A portable radio terminal claimed in claim 1 wherein when said display control means defers the outputting of said liquid crystal alternating signal, said display control means defers an outputting of a horizontal scan signal and a frame signal to be supplied to said liquid crystal display means.

3. A portable radio terminal claimed in claim 2 wherein said radio transmitting and receiving means transmits and receives data in a time division system, and said display control means defers the outputting of said liquid crystal alternating signal by a length of time on the order of several milliseconds which corresponds to one receiving time slot.

4. A portable radio terminal claimed in claim 3 wherein said display control means deters the outputting of said horizontal scan signal and said frame signal by a length of time on the order of several milliseconds which corresponds to one receiving time slot.

5. A portable radio terminal claimed in claim 4 wherein said control means ceaselessly updates the data stored in the memory means to a latest information, and said display control means reads the data from said memory means at the time of transferring said display data to said liquid crystal display means.

6. A portable radio terminal claimed in claim 3 wherein said control means ceaselessly updates the data stored in the memory means to a latest information, and said display control means reads the data from said memory means at the time of transferring said display data to said liquid crystal display means.

7. A portable radio terminal claimed in claim 2 wherein said radio transmitting and receiving means transmits and receives data in a time division system, and said display control means defers the outputting of said horizontal scan signal and said frame signal by a length of time on the order of several milliseconds which corresponds to one receiving time slot.

8. A portable radio terminal claimed in claim 7 wherein said control means ceaselessly updates the data stored in the memory means to a latest information, and said display control means reads the data from said memory means at the time of transferring said display data to said liquid crystal display means.

9. A portable radio terminal claimed in claim 1 wherein said radio transmitting and receiving means transmits and receives data in a time division system, and said display control means defers the outputting of said liquid crystal alternating signal by a length of time on the order of several milliseconds which corresponds to one receiving time slot.

10. A portable radio terminal claimed in claim 9 wherein said control means ceaselessly updates the data stored in the memory means to a latest information, and said display control means reads the data from said memory means at the time of transferring said display data to said liquid crystal display means.

11. A portable radio terminal comprising:
    a radio transmitting and receiving means for transmitting and receiving a radio data;
    a memory means for storing a display data;
    a control means receiving data received by said radio transmitting and receiving means, to generate a display data and to write said display data into said memory means; and
    a liquid crystal display means for visually displaying said display data,
    said control means reading out said display data from said memory means for controlling said liquid crystal display means to cause said liquid crystal display means to visually display said display data, said control means outputting a liquid crystal alternating signal to said liquid crystal display means at each time an image displayed in said liquid crystal display means is changed from one frame to a next frame, thereby to invert an angle of a liquid crystal in said liquid crystal display means,
    wherein when a radio data receiving period overlaps the timing of outputting said liquid crystal alternating signal, said control means defers the outputting of said liquid crystal alternating signal until said radio data receiving period ends, whereby the angle of the liquid crystal in said liquid crystal display means is not inverted until said radio data receiving period ends.

12. A portable radio terminal claimed in claim 11 wherein when said control means defers the outputting of said liquid crystal alternating signal, said control means defers an outputting of a horizontal scan signal and a frame signal to be supplied to said liquid crystal display means.

13. A portable radio terminal claimed in claim 12 wherein said radio transmitting and receiving means transmits and receives data in a time division system, and said control means defers the outputting of said liquid crystal alternating signal by a length of time on the order of several milliseconds which corresponds to one receiving time slot.

14. A portable radio terminal claimed in claim 13 wherein said control means defers the outputting of said horizontal scan signal and said frame signal by a length of time on the order of several milliseconds which corresponds to one receiving time slot.

15. A portable radio terminal claimed in claim 14 wherein said control means ceaselessly updates the data stored in the memory means to a latest information, and said control means reads the data from said memory means at the time of transferring said display data to said liquid crystal display means.

16. A portable radio terminal claimed in claim 13 wherein said control means ceaselessly updates the data stored in the memory means to a latest information, and said control means reads the data from said memory means at the time of transferring said display data to said liquid crystal display means.

17. A portable radio terminal claimed in claim 12 wherein said radio transmitting and receiving means transmits and receives data in a time division system, and said control means defers the outputting of said horizontal scan signal and said frame signal by a length of time on the order of several milliseconds which corresponds to one receiving time slot.

18. A portable radio terminal claimed in claim 17 wherein said control means ceaselessly updates the data stored in the memory means to a latest information, and said control means reads the data from said memory means at the time of transferring said display data to said liquid crystal display means.

19. A portable radio terminal claimed in claim 11 wherein said radio transmitting and receiving means transmits and receives data in a time division system, and said control means defers the outputting of said liquid crystal alternating signal by a length of time on the order of several milliseconds which corresponds to one receiving time slot.

20. A portable radio terminal claimed in claim 19 wherein said control means ceaselessly update, the data stored in the memory means to a latest information, and said control means reads the data from said memory means at the time of transferring said display data to said liquid crystal display means.

* * * * *